United States Patent [19]

Thibodeau

[11] Patent Number: 4,980,790
[45] Date of Patent: Dec. 25, 1990

[54] FAULT INDICATING MEANS

[75] Inventor: Joseph R. Thibodeau, Dedham, Mass.

[73] Assignee: Sigma Instruments, Inc., Weymouth, Mass.

[21] Appl. No.: 297,959

[22] Filed: Jan. 17, 1989

[51] Int. Cl.⁵ .............................................. H02H 7/04
[52] U.S. Cl. ....................................... 361/38; 361/35; 361/59
[58] Field of Search ...................... 361/35, 36, 38, 59, 361/63, 65, 79, 87, 93

[56] References Cited

U.S. PATENT DOCUMENTS 3,715,742 2/1973 Schweitzer, Jr. ................. 361/59 X
3,870,928 3/1975 Allen .................................. 361/59 X
4,288,743 9/1981 Schweitzer ........................ 361/58 X Primary Examiner—Derek S. Jennings
Attorney, Agent, or Firm—Leo Stanger

[57] ABSTRACT

The reset circuit of a fault indicator is coupled to a transformer secondary winding by a cable having an elongated conductor and a resistance close to the secondary winding. The resistance is capable of withstanding a minimum transient impulse of 10 kv.

10 Claims, 2 Drawing Sheets

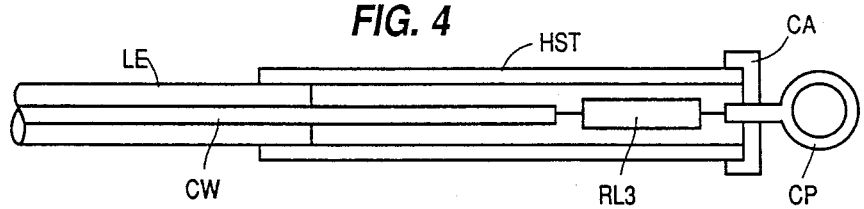
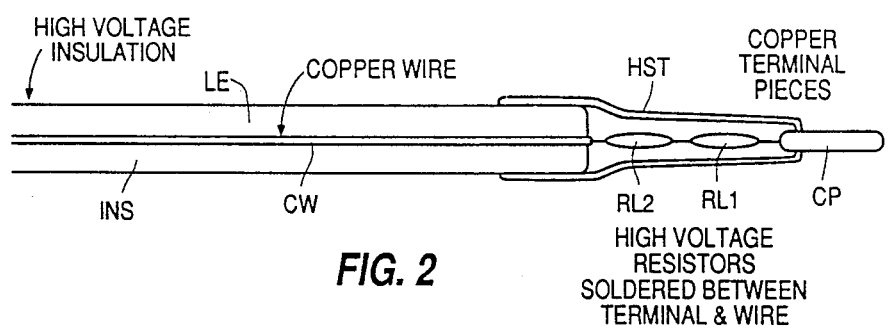
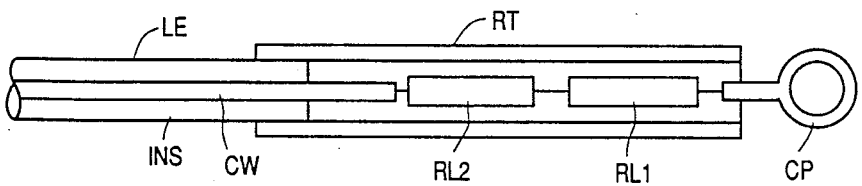

FAULT INDICATING MEANS

BACKGROUND OF THE INVENTION

This invention relates to fault indicating arrangements for indicating faults in power distribution lines.

Fault indicators having reset circuits energized by the secondary winding of a distribution transformer are known. However, it was assumed that one could safely bring the energy from the secondary winding to a remote fault indicator only by a distributed impedance line. Users regarded direct lines as hazardous either to the instruments or personnel working on the transformers.

OBJECTS AND SUMMARY OF THE INVENTION

An object of the invention is to simplify fault indicating arrangements by eliminating the use of distributed impedance lines.

The invention uses a lumped resistance connected adjacent to the transformer secondary winding and an insulated conductor more remote from the secondary winding to power the reset circuits of fault indicators.

BRIEF DESCRIPTION OF THE DRAWINGS

FIG. 2 is a diagram of the cable for connecting the transformer secondary winding to the fault indicator.

DESCRIPTION OF PREFERRED EMBODIMENTS

Figure 1:
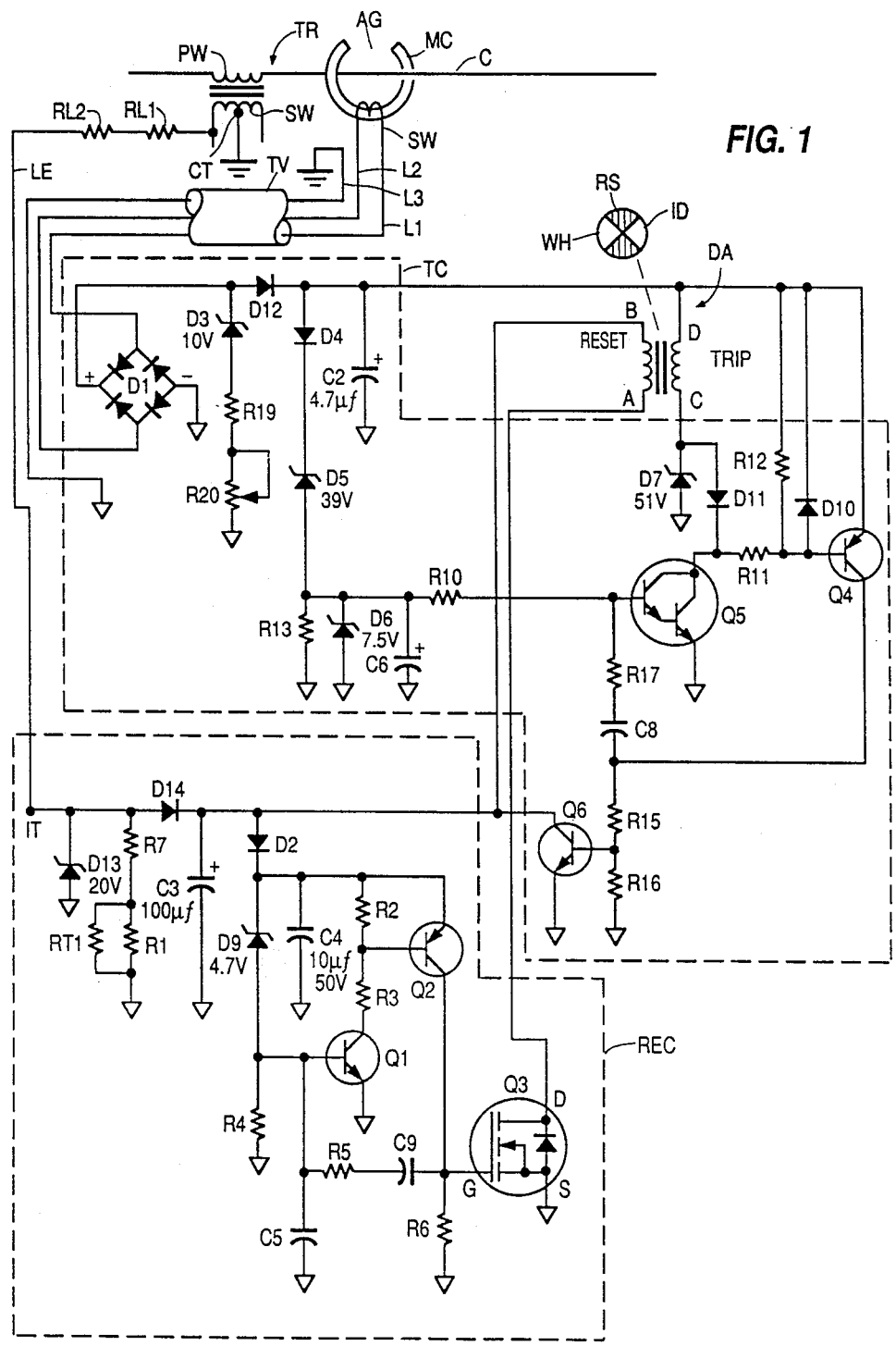
FIG. 1 is a schematic diagram of a system embodying the invention.

In FIG. 1, a high voltage conductor C of an electric power distribution system carries current at 60 Hz and is connected to the primary winding PW of a distribution transformer TR. A secondary winding SW on the transformer TR produces a voltage such as 230 volts which is divided by a center-tap CT into two 115 volt sections, one on each side of the centertap.

In the fault indicator of the invention, a V-shaped magnetic core MC with an air gap AG substantially surrounds the conductor C. The core MC couples the flux changes arising from current alternations through the conductor C into a sense winding SW. Leads L1 and L2 and a ground lead L3 extend from the sense winding SW through flexible insulating tubing TU to a trip circuit TC when the magnetic core MC and the sense winding SW detect a fault current in the conductor C.

In the trip circuit TC, a rectifier bridge D1 rectifies the current sensed by the sense winding SW and applies this voltage across a series circuit composed of a 10 volt Zener diode D3, operation setting resistors R19 and R20. Through a diode D12, the bridge DI also applies the voltage across a capacitor C2 as well as a series network composed of a diode D4, a 39 volt Zener diode D5 and a resistor R13. A Zener diode D6 and a capacitor C6 shunt the resistor R13. A series resistor R10 applies the voltage across the shunted resistor R13 to the base input of a Darlington pair Q5. The collector-emitter path of the Darlington pair Q5 forms a series circuit with the trip winding CD of a display actuator DA. The latter includes a rotatable target or indicating disc ID. The target ID contains red sections RS and white sections WH and rotates with respect to a mask to reveal either the red sections or the white sections. Other color combinations or alphanumeric codes may be used. When the red sections RS appear, the display actuator DA shows that a fault current has passed through the conductor C.

A feedback circuit composed of resistors R11, R12, a diode D10, a transistor Q4, a capacitor C8 and a resistor R17 maintains conduction of the Darlington pair Q5 during the discharge period of the capacitor C2. Through collector resistors R15 and R16, transistor Q4 also energizes a transistor Q6 that limits operation of a reset circuit REC during the discharge of the capacitor C2.

The reset circuit REC receives its energy from the secondary winding SW of the transformer TR through two lumped 25 kohm series resistors RL1 and RL2, both resistors being able to withstand a minimum transient impulse of 10 kv, and a 16 AWG, 20 kv insulated lead LE, i.e. a lead having copper wire insulated to withstand a high voltage namely 20 kv. According to another embodiment of the invention, a single 50 kohm resistor, capable of withstanding a minimum transient impulse of 10 kv, is used instead of the two resistors RL1 and RL2.

In the reset circuit REC, a Zener diode D13, from an input tap IT at the end of the lead LE to ground, protects the circuit REC by preventing the voltage from exceeding 20 volts. Three resistors R7, RT1, and R1 from the tap IT to ground form a temperature compensation network. A series diode D14 and a parallel 100 microfarad capacitor C3 peak detect the voltage input and form a unidirectional voltage proportional to the peak voltage excursions of the tap IT. The Capacitor C3 stores the energy used to rotate the target ID.

A diode D2, a Zener diode D9, and a resistor R4 form a voltage divider which turns on a transistor Q1 when the voltage at capacitor C3 reaches a desired level such as 4.8 volts. The transistor Q1 then turns on a transistor Q2. The latter then turns on a MOSFET Q3 which then discharges the capacitor C3 through a winding AB in the display actuator DA. This turns the target ID to display the white sectors WH. A feedback circuit composed of resistors R5 and R6 and capacitors C5 and C9 maintains conduction of transistors Q1 and Q2 during the discharge period of the capacitor C3.

FIG. 2 illustrates the structure of the lead LE. Here, the two high voltage resistors RL1 and RL2 are soldered between a copper terminal piece CP, connected to the secondary winding SW, and a copper wire CW. High voltage insulation INS covers the wire CW and heat shrinkable insulating tubing covers both the resistors RL1 and RL2 and the wire CW.

FIG. 3 illustrates another embodiment of the lead LE. Here, a rigid insulating tube RT covers the resistors RL1 and RL2. The terminal piece CP is in the form of a lug. FIG. 4 differs from FIG. 3 in a single 10 kv, 50 kohm resistor RL3 replacing the two resistors RL1 and RL2 of FIG. 3. Also, an insulating support cap CA covers the end of the tube HST.

In operation, during normal current flow the voltage from the transformer secondary winding SW energizes the reset circuit REC. The MOSFET Q3 of the reset circuit REC repeatedly discharges the capacitor C3 through the winding AB. This rotates the target ID to the no-fault indicating position where the white sectors WH of the target are visible. During a fault the current in the conductor C, the voltage generated in the bridge D1 by the sense winding SW triggers the Darlington pair Q5 and discharges the capacitor C2. The resulting current through the winding CD rotates the target ID to display the red sectors RS that show a fault condition. At the same time the transistor Q6 drains the capacitor C3 and prevents it from initiating a reset signal as long as the transistor Q6 is on. This prevents the reset circuit REC from restoring the no-fault position of the target ID while the capacitor C2 is discharging. The target is arranged to maintain its position until the display actuator DA receives further energization.

The lead LE with its two resistors allows the fault indicator to be placed at a position remote from the transformer TR.

According to other embodiments of the invention, other trip and reset circuits may be used.

While embodiments of the invention have been described in detail, it will be evident to those skilled in the art that the invention may be embodied otherwise.

What is claimed is:

1. Current responsive means for use with a distribution transformer having a high voltage primary winding and a secondary winding, comprising:
   a display for displaying faults;
   a reset circuit for continually actuating the display and causing an indication in one direction;
   a trip circuit coupled to the primary winding for actuating said display and causing an indication in another direction in response to faults in the primary winding;
   a cable connecting the secondary winding to the reset circuit to energize the reset circuit, said cable having an elongated conductor connected to the reset circuit and lumped resistive means connected to said secondary winding, said cable having high voltage insulating means surrounding said conductor and said lumped resistive means;
   said lumped resistive means being shorter in length than said conductor and having a substantially higher resistance than said conductor.

2. A device as in claim 1, wherein said lumped resistive means includes a single lumped resistor.

3. A device as in claim 1, wherein said lumped resistive means includes a pair of series connected resistors.

4. A device as in claim 1, wherein said lumped resistive means is connected mechanically more closely to said transformer than to said reset circuit.

5. A device as in claim 3, wherein said pair of resistors is connected mechanically more closely to said transformer than to said reset circuit.

6. A fault indicating device to be energized by a distribution transformer having a high voltage primary winding and a secondary winding, comprising:
   a display for displaying faults;
   a reset circuit for continually actuating the display and causing an indication in one direction;
   a trip circuit coupled to the primary winding for actuating said display and causing an indication in another direction in response to faults in the primary winding;
   safety connecting means for connecting the secondary winding to said reset circuit to energize said reset circuit and so as substantially to limit voltages appearing at the transformer to an insulated path between the transformer and said reset circuit and thereby avoid the threat of transformer voltages to personnel, said safety connecting means having an elongated conductor connected to the reset circuit and lumped resistive means connected to said secondary winding as well as high voltage insulating means surrounding said conductor and said lumped resistive means;
   said lumped resistive means being shorter in length than said conductor and having a substantially higher resistance than said conductor.

7. A device as in claim 6, wherein said lumped resistive means includes a single lumped resistor.

8. A device as in claim 6, wherein said lumped resistive means includes a pair of series connected resistors.

9. A device as in claim 6, wherein said lumped resistive means is connected mechanically more closely to said transformer than to said reset circuit.

10. A device as in claim 8, wherein said pair of resistors is connected mechanically more closely to said transformer than to said reset circuit.

* * * * *